United States Patent
Higuchi

(10) Patent No.: US 11,890,679 B2
(45) Date of Patent: Feb. 6, 2024

(54) MANUFACTURING METHOD OF THREE-DIMENSIONAL OBJECT AND MANUFACTURING METHOD OF SHEET CUTTING APPARATUS

(71) Applicant: Sodick Co., Ltd., Kanagawa (JP)

(72) Inventor: Shigeo Higuchi, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 160 days.

(21) Appl. No.: 17/572,600

(22) Filed: Jan. 10, 2022

(65) Prior Publication Data

US 2022/0258245 A1    Aug. 18, 2022

(30) Foreign Application Priority Data

Feb. 15, 2021    (JP) ................. 2021-021746

(51) Int. Cl.
| | | |
|---|---|---|
| B33Y 40/20 | (2020.01) | |
| B22F 12/30 | (2021.01) | |
| B33Y 10/00 | (2015.01) | |
| B22F 10/28 | (2021.01) | |
| B22F 10/66 | (2021.01) | |
| B22F 12/41 | (2021.01) | |

(52) U.S. Cl.
CPC ............. *B22F 10/66* (2021.01); *B22F 12/30* (2021.01); *B22F 12/41* (2021.01); *B33Y 40/20* (2020.01); *B22F 10/28* (2021.01); *B33Y 10/00* (2014.12)

(58) Field of Classification Search
CPC .......... B22F 12/30; B22F 10/28; B22F 12/41; B22F 12/00; B29C 64/245; B29C 64/153; B33Y 10/00; B33Y 30/00; B33Y 80/00
See application file for complete search history.

(56) References Cited

U.S. PATENT DOCUMENTS

| | | | |
|---|---|---|---|
| 6,483,596 B1 * | 11/2002 | Philippi ................. | B33Y 50/00 |
| | | | 356/615 |
| 8,994,592 B2 | 3/2015 | Scott et al. | |
| 2011/0241947 A1 * | 10/2011 | Scott ....................... | B22F 10/66 |
| | | | 428/156 |
| 2016/0185041 A1 * | 6/2016 | Lisagor .................. | B29C 70/78 |
| | | | 264/257 |

(Continued)

FOREIGN PATENT DOCUMENTS

JP    5632381    11/2014

OTHER PUBLICATIONS

"Search Report of Europe Counterpart Application", dated May 25, 2022, pp. 1-10.

*Primary Examiner* — Jerzi H Moreno Hernandez
(74) *Attorney, Agent, or Firm* — JCIPRNET

(57) ABSTRACT

A manufacturing method of a three-dimensional object includes: a positioning step, an adhering step, a placing step, an additive manufacturing step, and a detaching step. In the positioning step, a fixing plate in which adhesive injection holes are formed is placed on a thin plate, and the thin plate is positioned on the fixing plate. In the adhering step, an adhesive is dripped to the adhesive injection holes, and the fixing plate is adhered to the thin plate. In the additive manufacturing step, a three-dimensional object in which the thin plate and a solidified layer are integrated is formed. In the detaching step, adhesion between the thin plate and the fixing plate is removed by a removing agent corresponding to the adhesive.

11 Claims, 8 Drawing Sheets

(56) References Cited

U.S. PATENT DOCUMENTS

| | | |
|---|---|---|
| 2017/0036400 A1* | 2/2017 | Loeffler ................ B29C 64/245 |
| 2019/0308242 A1* | 10/2019 | Matsumoto ............ B33Y 40/00 |
| 2020/0023436 A1 | 1/2020 | Matsumoto |
| 2020/0061914 A1* | 2/2020 | Onishi .................. B29C 64/393 |
| 2021/0031445 A1* | 2/2021 | Coeck .................... B22F 10/31 |
| 2021/0039315 A1 | 2/2021 | Ciscon et al. |

\* cited by examiner

MANUFACTURING METHOD OF THREE-DIMENSIONAL OBJECT AND MANUFACTURING METHOD OF SHEET CUTTING APPARATUS

CROSS-REFERENCE TO RELATED APPLICATION

This application claims the priority benefit of Japan application serial No. 2021-021746, filed on Feb. 15, 2021. The entirety of the above-mentioned patent application is hereby incorporated by reference herein and made a part of this specification.

BACKGROUND

Technical Field

The invention relates to a manufacturing method of a three-dimensional object. In addition, the invention relates to a manufacturing method of a sheet cutting apparatus using the manufacturing method of the three-dimensional object.

Description of Related Art

Various methods are known as additive manufacturing methods for three-dimensional objects. For example, an additive manufacturing apparatus performing powder bed fusion forms a material layer by leveling off a powder build material, and forms a solidified layer by irradiating the material layer with a laser beam or an electron beam. The formation of the material layer and the formation of the solidified layer are repeated multiple times to laminate multiple solidified layers, and a desired three-dimensional object is manufactured.

According to the disclosure of US publication no. US2020/0023436A1, in general, the solidified layers are formed on a plate member as the base, which is referred to as a base plate. The base plate is fixed to a build table configured to be movable in the vertical direction, and the material layers and the solidified layers are formed on the base plate. The solidified layers and the base plate are fixed to each other.

Although the base plate may be cut off from the solidified layers when necessary after additive manufacturing, a final product may also include the base plate.

There is a demand for using a thin plate thinner than the conventional base plate as the base and forming solidified layers on the thin plate by additive manufacturing to manufacture a three-dimensional object including the thin plate integrated with the solidified layers. Since it is difficult to directly fix the thin plate onto a build table, it is considered to mount the thin plate to a fixing plate, which is a plate member, and mount the thin plate on the build table via the fixing plate.

At this time, it is necessary to mount the thin plate to the fixing plate so that the thin plate is not distorted during additive manufacturing. Also, it is required that, after the additive manufacturing, the three-dimensional object including the thin plate and the solidified layers be easily and harmlessly detached from the fixing plate.

SUMMARY

According to an aspect of the invention, a manufacturing method of a three-dimensional object is provided. The manufacturing method includes: a positioning step of placing a fixing plate, in which a plurality of adhesive injection holes that are through holes are formed in a plate thickness direction, on a thin plate with a thickness of 1 mm or less, and positioning the thin plate to a predetermined position of the fixing plate; an adhering step of, after the positioning step, dripping an adhesive to the adhesive injection holes, and adhering the fixing plate to the thin plate; a placing step of, after the adhering step, fixing the fixing plate and the thin plate onto a build table configured to be movable in a vertical direction of an additive manufacturing apparatus at a position with the thin plate on top; an additive manufacturing step of, after the placing step, forming a plurality of solidified layers consisting of a build material on the thin plate by the additive manufacturing apparatus, and forming the three-dimensional object in which the thin plate and the solidified layers are integrated; and a detaching step of, after the additive manufacturing process, taking out the fixing plate and the three-dimensional object from the additive manufacturing apparatus, and removing adhesion between the thin plate and the fixing plate by using a removing agent corresponding to the adhesive.

DESCRIPTION OF THE EMBODIMENTS

The invention provides a manufacturing method of a three-dimensional object capable of easily attaching/detaching the thin plate to/from the fixing plate without distortion or damage during the manufacture of the three-dimensional object including a thin plate and solidified layers.

Multiple adhesive injection holes, which are through holes, are formed in the plate thickness direction in the fixing plate, and an adhesive is dripped to the adhesive injection holes to fix the fixing plate and the thin plate. Therefore, the thin plate can be easily fixed with the fixing plate. In addition, at the time of removing the three-dimensional object including the thin plate from the fixing plate, by supplying the removing agent through the through holes, the fixing can be easily releasing without applying a relatively large load to the three-dimensional object.

In the following, the embodiments of the invention will be described with reference to the drawings. Various modified examples described in the following may be combined optionally and implemented.

Figure 1:
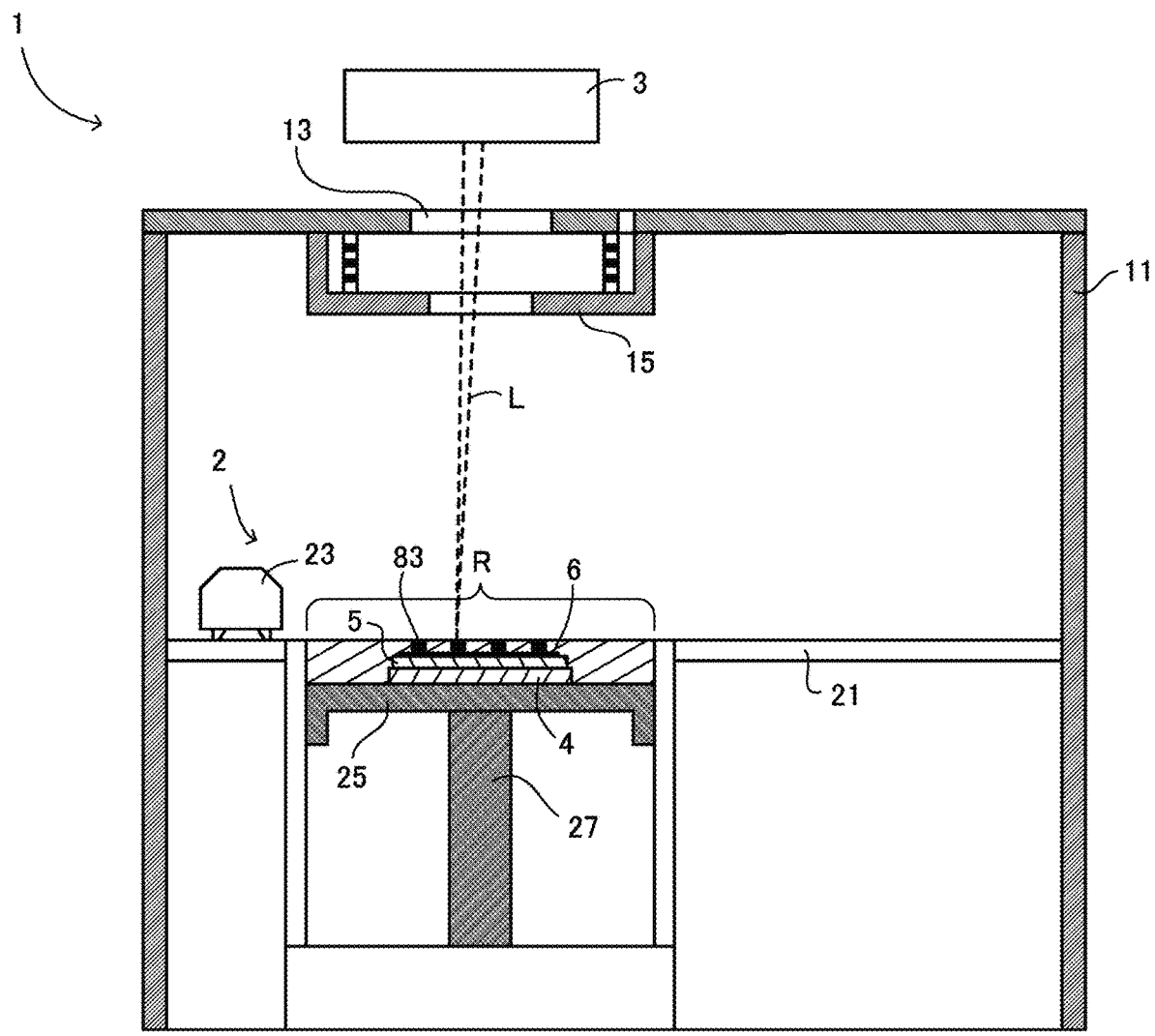
FIG. 1 is a view illustrating a schematic configuration of an additive manufacturing apparatus.

A desired three-dimensional object 85 may be manufactured by additive manufacturing performed by an additive manufacturing apparatus 1 shown in FIG. 1. The additive manufacturing apparatus 1 of the embodiment is an apparatus for performing powder bed fusion. The additive manufacturing apparatus 1 includes a chamber 11, a material layer forming device 2, and an irradiation device 3.

The chamber 11 is configured to be substantially enclosed, and covers a build region R, which is a region where the desired three-dimensional object 85 is formed. During manufacturing, an inert gas is supplied from an inert gas supplier (not shown) to the chamber 11, and the chamber 11 is filled with the inert gas at a predetermined concentration. The inert gas supplier is, for example, an inert gas generator generating the inert gas from air, or a gas cylinder storing the inert gas. In addition, the inert gas including fume generated when a solidified layer 83 is formed is discharged out of the chamber 11. The inert gas discharged from the chamber 11 may be sent back to the chamber 11 after the fume is removed by a fume collector (not shown). The fume collector, for example, is an electrostatic precipitator or a filter. The inert gas refers to a gas substantially not reactive with a material layer 81 or the solidified layer 83, and a suitable one is selected from a nitrogen gas, an argon gas, a helium gas, etc., in accordance with the type of the build material.

The material layer forming device 2 is provided in the chamber 11, and forms the material layer 81 in a predetermined thickness. The material layer forming device 2 includes a base table 21 having the build region R, and a recoater head 23 provided on the base table 21. The recoater head 23 is configured to be movable in the horizontal direction by a recoater head driving device (not shown) having any actuator. A build table 25 is provided in the build region R. On an upper surface of the build table 25, multiple fastening holes to be screwed with bolts 77 are provided at predetermined positions. The build table 25 is configured to be movable in the vertical direction by a build table driving device 27 having any actuator.

At the time of manufacturing, a thin plate 6, as the base for forming the solidified layer 83, is placed on the build table 25, and a first material layer 81 is formed on the thin plate 6. In the embodiment, the thin plate 6 is fixed to the build table 25 via a sub-plate 4 and a fixing plate 5.

The recoater head 23 includes a material container, a material supply port, and a material discharge port. The material container stores the build material. The material supply port is provided on an upper surface of the material container, and serves as an inlet of the build material supplied from a material supply device (not shown) to the material container. The material discharge port is provided on a bottom surface of the material container, and discharges the build material stored in the material container. The material discharge port has a slit shape extending in the horizontal direction orthogonal to the movement direction of the recoater head 23. On side surfaces of the recoater head 23, a pair of blades leveling off the build material to form the material layer 81 is provided. The recoater head 23 reciprocates in the horizontal direction on the build region R while discharging the build material stored in the material container from the material discharge port. At this time, the blade flattens the discharged build material to form the material layer 81.

In the embodiment, the build material is, for example, a metal powder. Specifically, when it is necessary to bend the three-dimensional object 85 in use, a build material with higher toughness is required. In the embodiment, a steel material equivalent to maraging steel substantially free of cobalt (referred to as Co-free maraging steel in the following) is used. As an example, the Co-free maraging steel includes 0.03 wt % or less of carbon, 0.4 wt % or less of silicon, 0.12 wt % or less of manganese, 17 wt % or more and 19 wt % or less of nickel, 1.5 wt % or more and 2.5 wt % or less of molybdenum, 0.5 wt % or more and 2.0 wt % or less of titanium, 1.5 wt % or less of aluminum, and 0.03 wt % or less of oxygen, and the balance consists of iron and inevitable impurities. The build material may also be other materials. For example, maraging steel may also be used. As an example, the maraging steel includes 0.03 wt % or less of carbon, 0.12 wt % or less of silicon, 0.12 wt % or less of manganese, 16.5 wt % or more and 19 wt % or less of nickel, 7.0 wt % or more and 9.5 wt % or less of cobalt, 4.5 wt % or more and 5.2 wt % or less of molybdenum, 0.8 wt % or less of titanium, and 0.15 wt % or less of aluminum, and the balance consists of iron and inevitable impurities.

Figure 2:
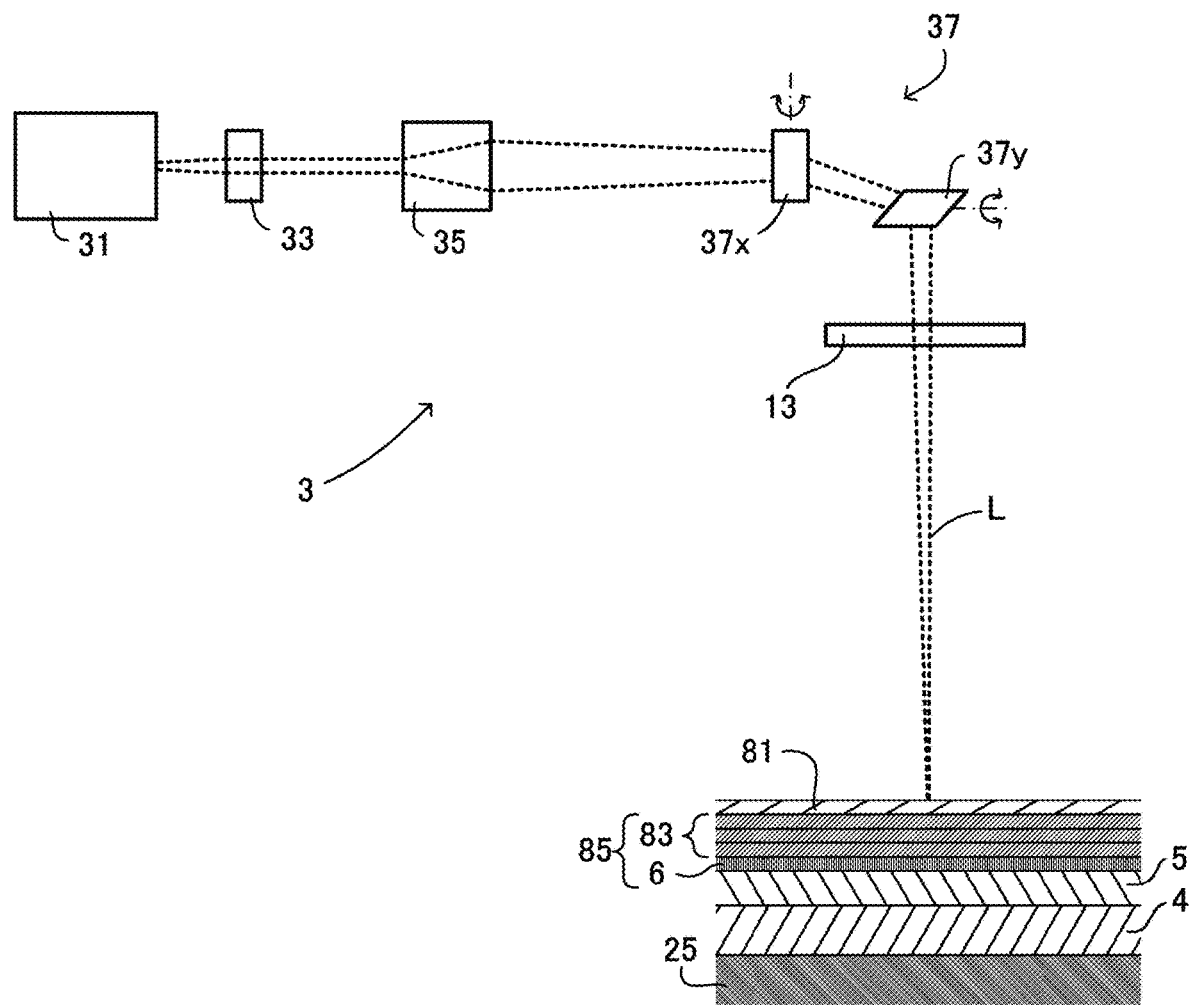
FIG. 2 is a view illustrating a schematic configuration of an irradiation device.

The irradiation device 3 is provided above the chamber 11. The irradiation device 3 irradiates a predetermined irradiation region of the material layer 81 formed on the build region R with laser beam L, melts or sinters the material layer 81 at the irradiated position and forms the solidified layer 83. The irradiation region is present in the build region R, and is substantially consistent with a region surrounded by the contour shape of the three-dimensional object at a predetermined divided layer. As shown in FIG. 2, the irradiation device 3 includes a beam source 31, a collimator 33, a focus control unit 35, and a scanner 37.

The beam source 31 generates the laser beam L. Here, the type of the laser beam L is not particularly limited, as long as the laser beam L can sinter or melt the material layer 81. The laser beam L may be fiber laser, $CO_2$ laser, YAG laser, green laser, or blue laser. The collimator 33 converts the laser beam L output by the beam source 31 into parallel light. The focus control unit 35 has a focus adjustment lens and a lens actuator moving the focus adjustment lens forward and backward, and adjusts the laser beam L output by the beam source 31 to the laser L having a desired spot diameter. The scanner 37 is, for example, a galvano scanner. The scanner 37 has an X-axis galvano mirror 37$x$, an X-axis mirror actuator rotating the X-axis galvano mirror 37$x$, a Y-axis galvano mirror 37$y$, and a Y-axis mirror actuator rotating the Y-axis galvano mirror 37$y$. The rotation angles of the X-axis galvano mirror 37$x$ and the Y-axis galvano mirror 37$y$ are controlled, and the X-axis galvano mirror 37$x$ and the Y-axis galvano mirror 37$y$ perform two-dimensional scanning on the laser beam L output by the beam source 31.

The laser beam L passing through the X-axis galvano mirror 37$x$ and the Y-axis galvano mirror 37$y$ transmits through a window 13 provided on an upper surface of the chamber 11, and is irradiated to the material layer 81 formed on the build region R. The window 13 is formed by a material through which the laser beam L is able to transmit. For example, in the case where the laser beam L is fiber laser or YAG laser, the window 13 may be made of quartz glass.

On the upper surface of the chamber 11, a pollution preventing device 15 is provided to cover the window 13. The pollution preventing device 15 includes a cylindrical housing and a cylindrical diffusing member provided in the housing. An inert gas supply space is provided between the housing and the diffusing member. In addition, an opening is provided on a bottom surface of the housing on an inner side of the diffusing member. Multiple pores are provided on the diffusing member, and a clean inert gas supplied to the inert gas supply space fills a clean space through the pores. In addition, the clean inert gas filling the clean space is flowed downwardly from the pollution preventing device 15 through the opening. Thus, fume is prevented from attaching to the window 13.

Although the irradiation device 3 of the embodiment is configured to irradiate the laser beam L to form the solidified layer 83, the irradiation device may be configured to irradiate an electron beam. For example, the irradiation device may include a cathode electrode emitting electrons, an anode electrode converging and accelerating electrons, a solenoid forming a magnetic field to converge the direction of the electron beam to a direction, and a collector electrode electrically connected with the material layer 81, which is an irradiated body. A voltage is applied between the cathode electrode and the collector electrode.

The additive manufacturing apparatus 1 may also include a cutting device performing cutting on a surface or an undesired portion of the solidified layer 83. The cutting device, for example, includes a processing head, a processing head driving device moving the processing head to a desired position in the chamber 11, and a spindle provided at the processing head to hold and rotate a cutting tool.

In the embodiment, the thin plate 6 serving as the base for the solidified layer 83 is positioned on the fixing plate 5 by using the sub-plate 4 and is adhered to the fixing plate 5. In addition, the thin plate 6 is fixed to the build table 25 via the sub-plate 4 and the fixing plate 5. In other words, in the embodiment, the sub-plate 4 is used as a positioning plate positioning the thin plate 6 and a mounting plate fixing the thin plate 6 and the fixing plate 5 to the build table 25.

Figure 3:
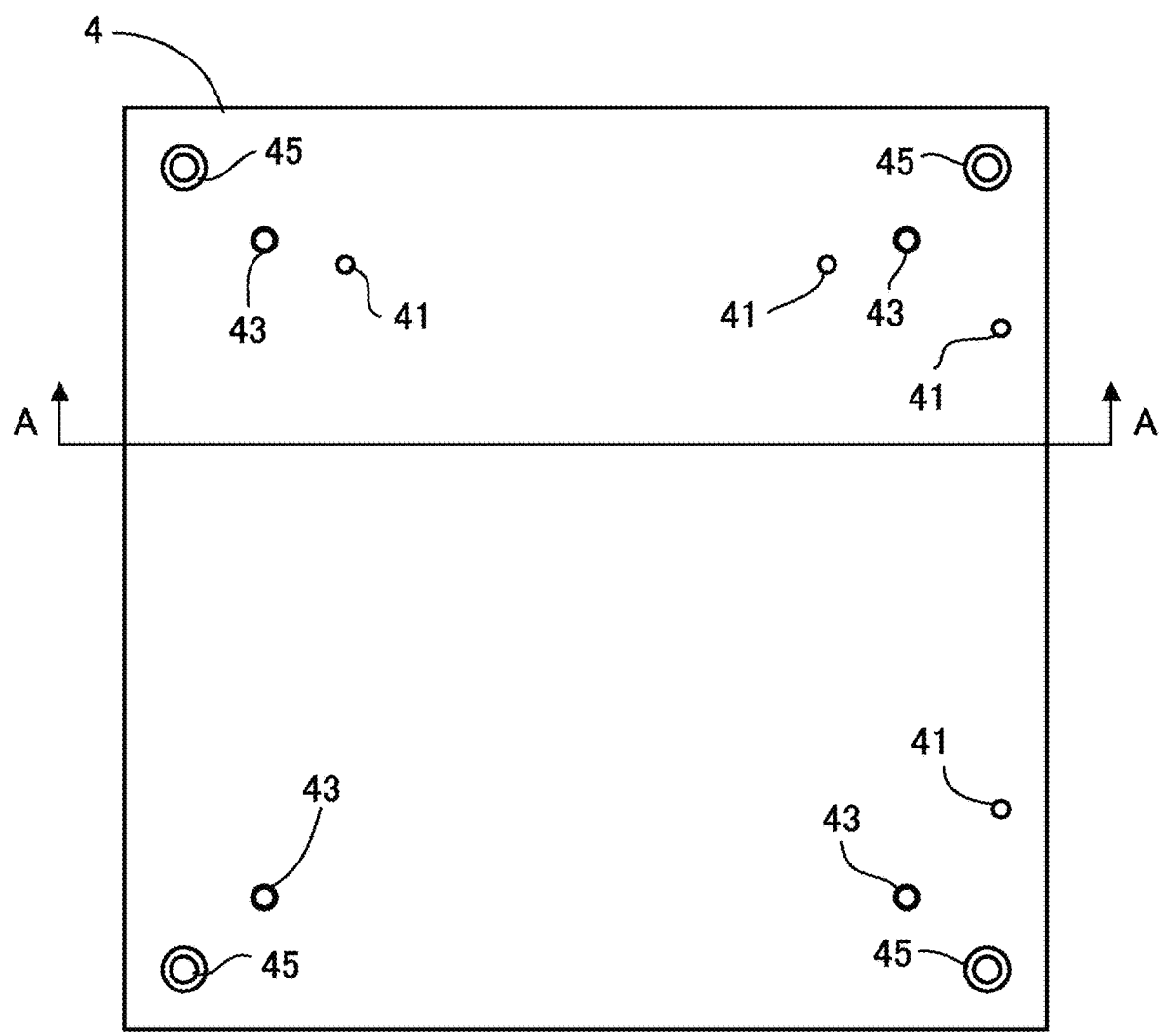
FIG. 3 is a top view of a sub-plate.
Figure 4:
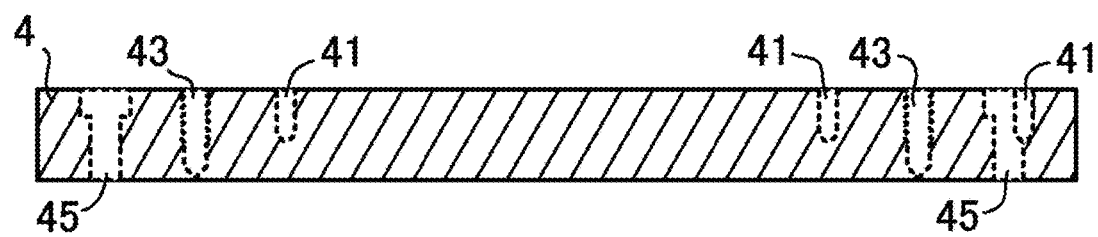
FIG. 4 is a cross-sectional view along A-A of FIG. 3.

As shown in FIGS. 3 and 4, the sub-plate 4 is a plate member in which a positioning hole 41, a fastening hole 43, and a fastening hole 45 are respectively provided in the plate thickness direction. Although the sub-plate 4 of the embodiment consists of a carbon steel for a mechanical structure use S50C, the sub-plate 4 may consists of other materials. The positioning hole 41 is a bottomed hole into which a positioning member 71 such as a knock pin is inserted. At least two positioning holes 41 may be provided. In the embodiment, four positioning holes 41 are formed in the sub-plate 4. At the time of positioning, the positioning members 71 are inserted into the positioning holes 41, and the thin plate 6 is positioned by bringing the thin plate 6 into contact with the positioning members 71. The fastening hole 43 is a bottomed hole into which a bolt 75 for fastening the sub-plate 4 and the fixing plate 5 is screwed. The fastening hole 45 is a through hole into which a bolt 77 for fastening the sub-plate 4 and the build table 25 is inserted.

Although the sub-plate 4 serving as the positioning plate as well as the mounting plate is used in the embodiment, a positioning plate and a mounting plate which are respectively separate components may also be used. That is, it may also be that a plate member where the positioning holes 41 into which the positioning members 71 are inserted are formed serves as the positioning plate, and a plate member where the fastening holes 43 into which the bolts 75 for fastening the sub-plate 4 and the fixing plate 5 are screwed and the fastening holes 45 into which the bolts 77 for fastening the sub-plate 4 and the build table 25 are inserted are formed serves as the mounting plate.

In addition, although the thin plate 6 is positioned by using the positioning members 71 inserted into the positioning holes 41 in the embodiment, the thin plate 6 may also be positioned in a different way. For example, it may also be that a recess part in the same shape as the thin plate 6 is formed in the positioning plate (or the sub-plate 4 as the positioning plate), and the thin plate 6 is positioned by being fit with the recess part. Alternatively, if holes into which the positioning members 71 are inserted are formed in the thin plate 6, it may also be that the fixing plate 5 and the thin plate 6 are directly aligned by using the positioning members 71 without using the positioning plate.

In addition, although the fixing plate 5 and the thin plate 6 are fixed to the build table 25 via the mounting plate (or the sub-plate 4 as the mounting plate) in the embodiment, the fixing plate 5 may also be directly fixed to the build table 25. However, by using the mounting plate, the fixing plate 5 can be configured smaller without taking into consideration the positions of the fastening holes of the build table 25. That is, the mounting plate may have a bottom area greater than the fixing plate 5. By configuring the fixing plate 5 smaller, the amount of a removing agent used at the time of releasing the adhesion between the fixing plate 5 and the thin plate 6 can be reduced. In addition, during manufacturing, in the case of pursuing a higher degree of parallelism of an upper surface of the thin plate 6, by processing a rear surface of the mounting plate, the thin plate 6 can be adjusted to be more horizontal.

Figure 5:
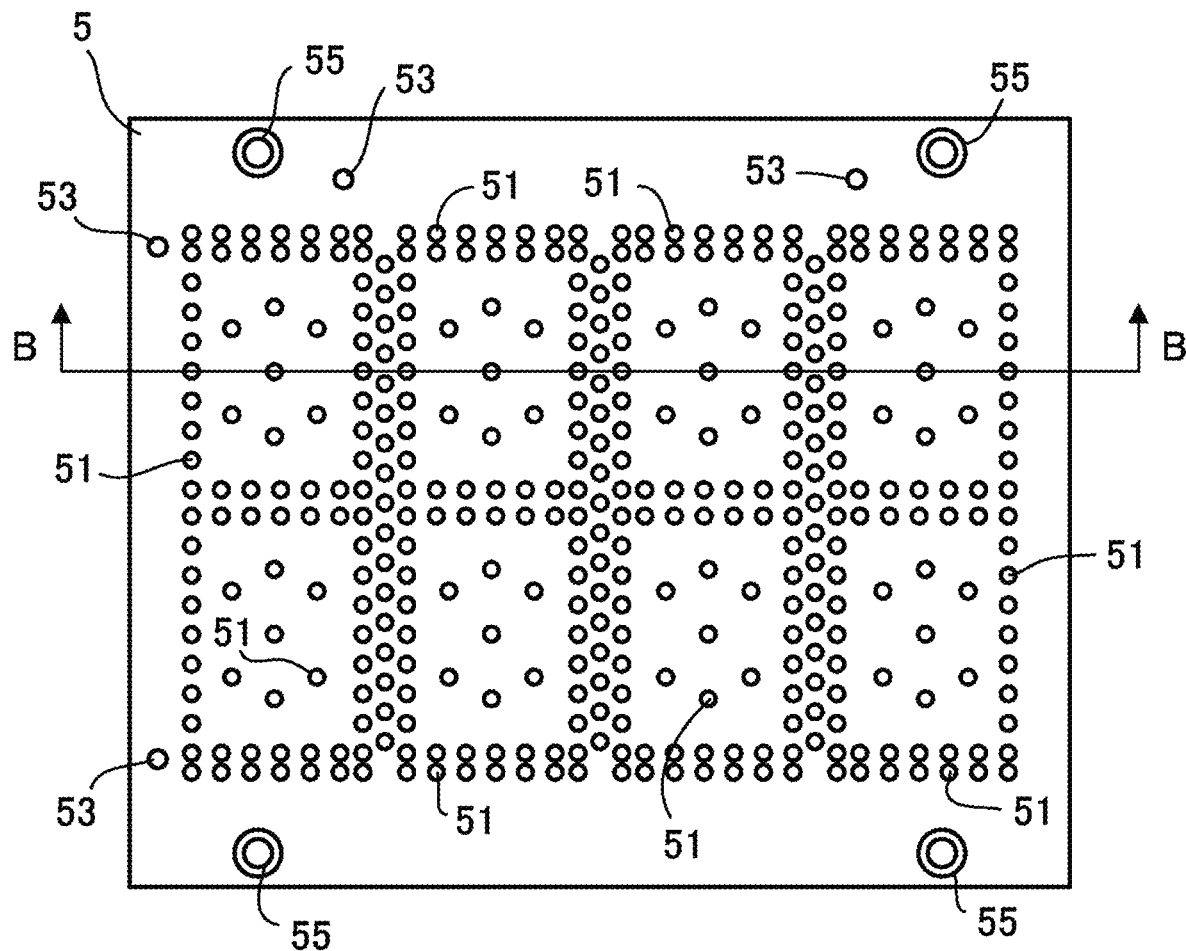
FIG. 5 is a top view of a fixing plate.
Figure 6:
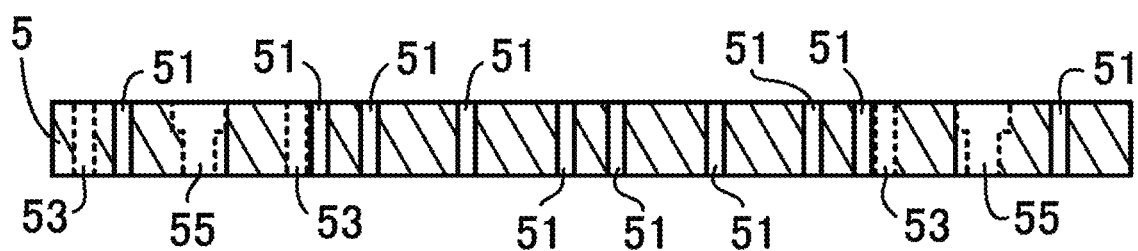
FIG. 6 is a cross-sectional view along B-B of FIG. 5.

As shown in FIGS. 5 and 6, the fixing plate 5 is a plate member in which an adhesive injection hole 51, a positioning hole 53, and a fastening hole 55 are respectively formed in the plate thickness direction. Although the fixing plate 5 of the embodiment consists of an alloy tool steel SKD11, the fixing plate 5 may consists of other materials. The adhesive injection hole 51 is a through hole into which the adhesive is dripped. Multiple adhesive injection holes 51 may be provided across the entire surface of the fixing plate 5. In the embodiment, 387 adhesive injection holes 51 are formed on the fixing plate 5. The positioning hole 53 is a through hole into which the positioning member 71 is inserted. The positioning hole 53 is formed at a place corresponding to the positioning hole 41 of the sub-plate 4. The fastening hole 55 is a through hole into which the bolt 75 for fastening the sub-plate 4 and the fixing plate 5 is inserted.

The thin plate 6 is a metal plate, and may have a thickness of 1 mm or less or, more preferably, a thickness of 0.5 mm or less. The thin plate 6 may be flexible. Compared with the conventional base plate, the thin plate 6 is sensitive to the influences of the heat at the time of solidification. Therefore, the thermal expansion coefficient of the thin plate 6 may be lower. Specifically, it is preferable that the thermal expansion coefficient of the thin plate 6 be $5.0 \times 10^{-6}/°$ C. or less. Specifically, the thin plate 6 of the embodiment consists of an invar (Fe-36Ni alloy), which is one of low thermal expansion alloys. The invar, as an example, includes 0.4 wt % or less of carbon, 0.7 wt % or less of manganese, and 35 wt % or more and 38 wt % or less of nickel, and the balance consists of iron and inevitable impurities. The thermal expansion coefficient of the invar is $2.0 \times 10^{-6}/°$ C. or less, such as about $1.2 \times 10^{-6}/°$ C. or less.

Figure 7:
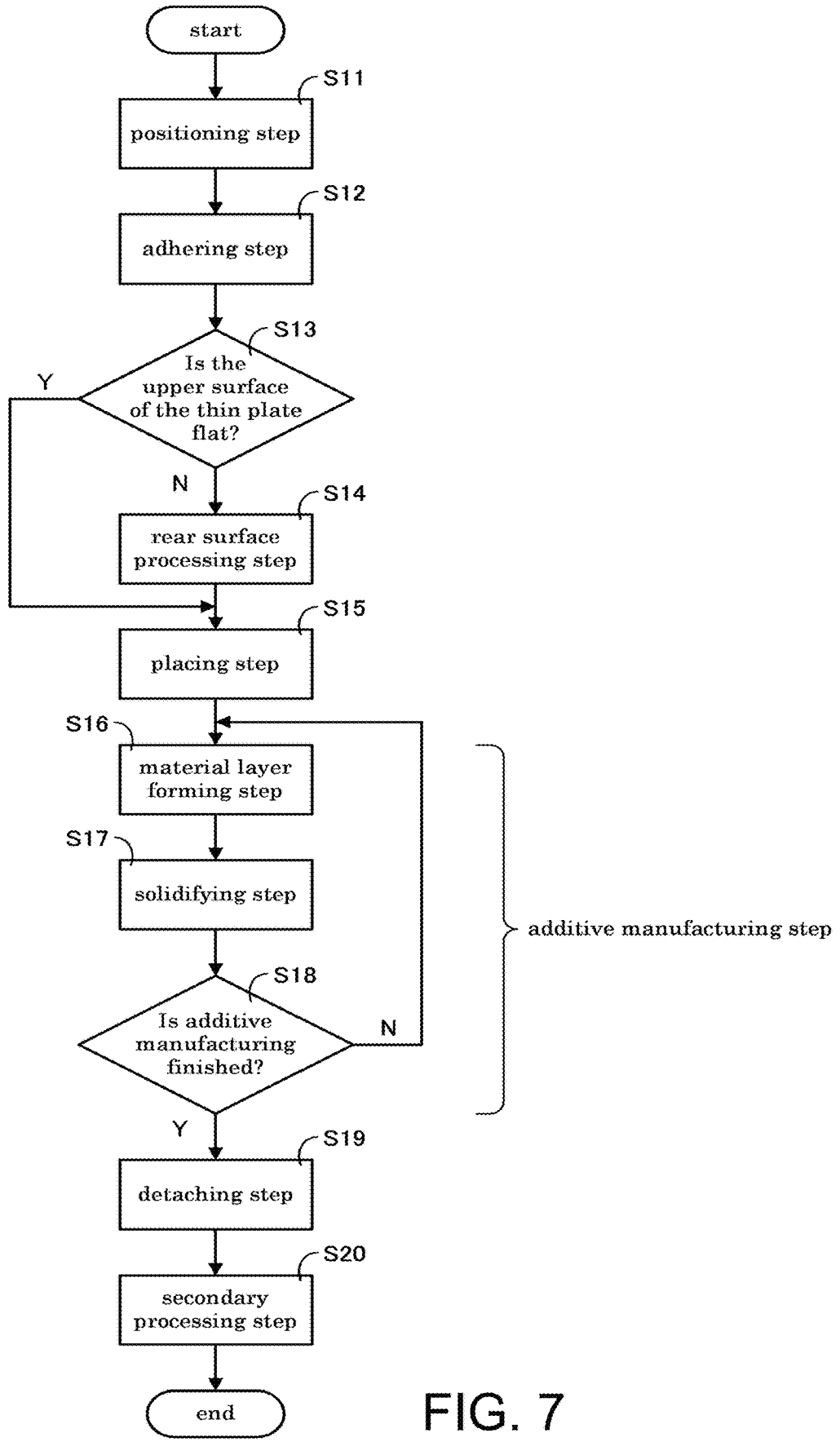
FIG. 7 is a flowchart of a manufacturing method of a three-dimensional object according to the embodiment.

Here, a manufacturing method of a three-dimensional object according to the embodiment is described. As shown in FIG. 7, the manufacturing method of the three-dimensional object according to the embodiment includes a positioning step, an adhering step, a rear surface processing step, a placing step, an additive manufacturing step, a detaching step, and a secondary processing step.

Firstly, the positioning step (S11) is performed. First, the positioning members 71 are inserted into the positioning holes 41 of the sub-plate 4 as the positioning plate, and the thin plate 6 is placed on the sub-plate 4. Next, the thin plate 6 is brought into contact with the positioning members 71, and the thin plate 6 is positioned at a predetermined position. Then, the fixing plate 5 is placed on the thin plate 6 while the positioning members 71 are fit with the positioning holes 53 of the fixing plate 5, and the fixing plate 5 is positioned at a predetermined position. Thus, the thin plate 6 is positioned at a predetermined position of the fixing plate 5.

Figure 8:
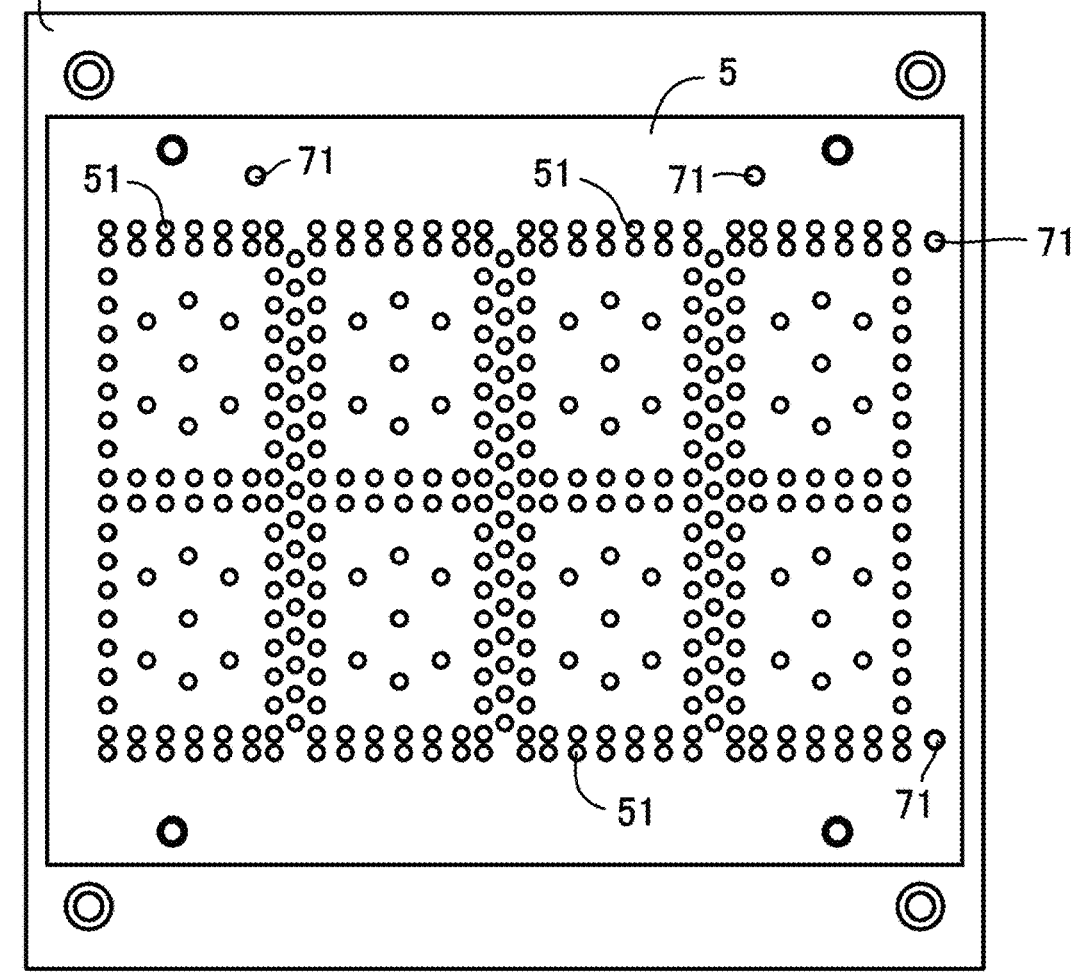
FIG. 8 is a top view of the sub-plate, a thin plate, and the fixing plate at a positioning step.
Figure 9:
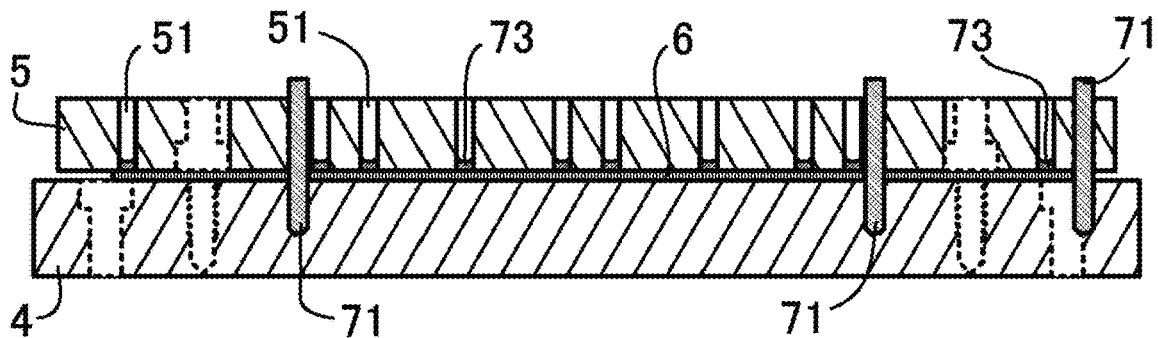
FIG. 9 is a cross-sectional side view of the sub-plate, the thin plate, and the fixing plate at the positioning step.

After the positioning step, the adhering step (S12) is performed. In a state in which the sub-plate 4, the thin plate 6, and the fixing plate 5 are stacked in order from the bottom, the adhesive is dripped into the adhesive injection holes 51 of the fixing plate 5. The adhesive is solidified in the adhesive injection hole 51 and becomes as an adhesive layer 73, and, as shown in FIGS. 8 and 9, the fixing plate 5 and the thin plate 6 are adhered. The adhesive may be of any type as long as the adhesive is able to adhere the fixing plate 5 and the thin plate 6. Nevertheless, the adhesive may be heat-resistant and removable by a corresponding removing agent. In the embodiment, a cyanoacrylate adhesive is used as the adhesive, and the corresponding removing agent is, for example, acetone. After the adhering step, the fixing plate 5 and the thin plate 6 adhered to each other are removed from the sub-plate 4 as the positioning plate, and the positioning members 71 are removed from the sub-plate 4.

With such positioning step and adhering step, the thin plate 6 can be easily positioned and fixed to the fixing plate 5. Also, since a rear surface of the thin plate 6 is adhered to the fixing plate 5, the adhesion can be stronger than adhering a periphery of the thin plate 6 to the fixing plate 5. Moreover, the adhesive layer 73 does not interfere the formation of the material layer 81.

Here, the degree of parallelism of the thin plate 6 is measured as necessary (S13). Firstly, the fixing plate 5 and the thin plate 6 are fastened by the bolts 75, at a position with the thin plate 6 on the top, to the sub-plate 4 as the mounting plate. Then, the sub-plate 4, the fixing plate 5, and the thin plate 6 are provided at a flat place, and the degree of parallelism of the upper surface of the thin plate 6 is measured by using a micrometer, etc. However, in the case where a high degree of parallelism is not required for the thin plate 6, this step may also be omitted.

In the case where the degree of parallelism of the upper surface of the thin plate 6 is measured, and the thin plate 6 does not have a sufficient degree of parallelism, a rear surface processing step (S14) is performed. Based on the data of the degree of parallelism of the current thin plate 6, a process for making the thin plate 6 horizontal is performed on a rear surface of the sub-plate 4 as the mounting plate. In the specification, an upper surface refers to a surface located on the upper side during the additive manufacturing step, and a rear surface refers to a surface located on the lower side during the additive manufacturing step. That is, the rear surface of the sub-plate 4 is a surface opposite to the surface to which the fixing plate 5 and the thin plate 6 are mounted, in other words, a surface brought into contact with the build table 25. Any method for processing the rear surface of the sub-plate 4 may be selected. For example, the processing may be performed by using a grinding apparatus. Thus, the thin plate 6 is adjusted to become horizontal at the time of the additive manufacturing step.

Figure 10:
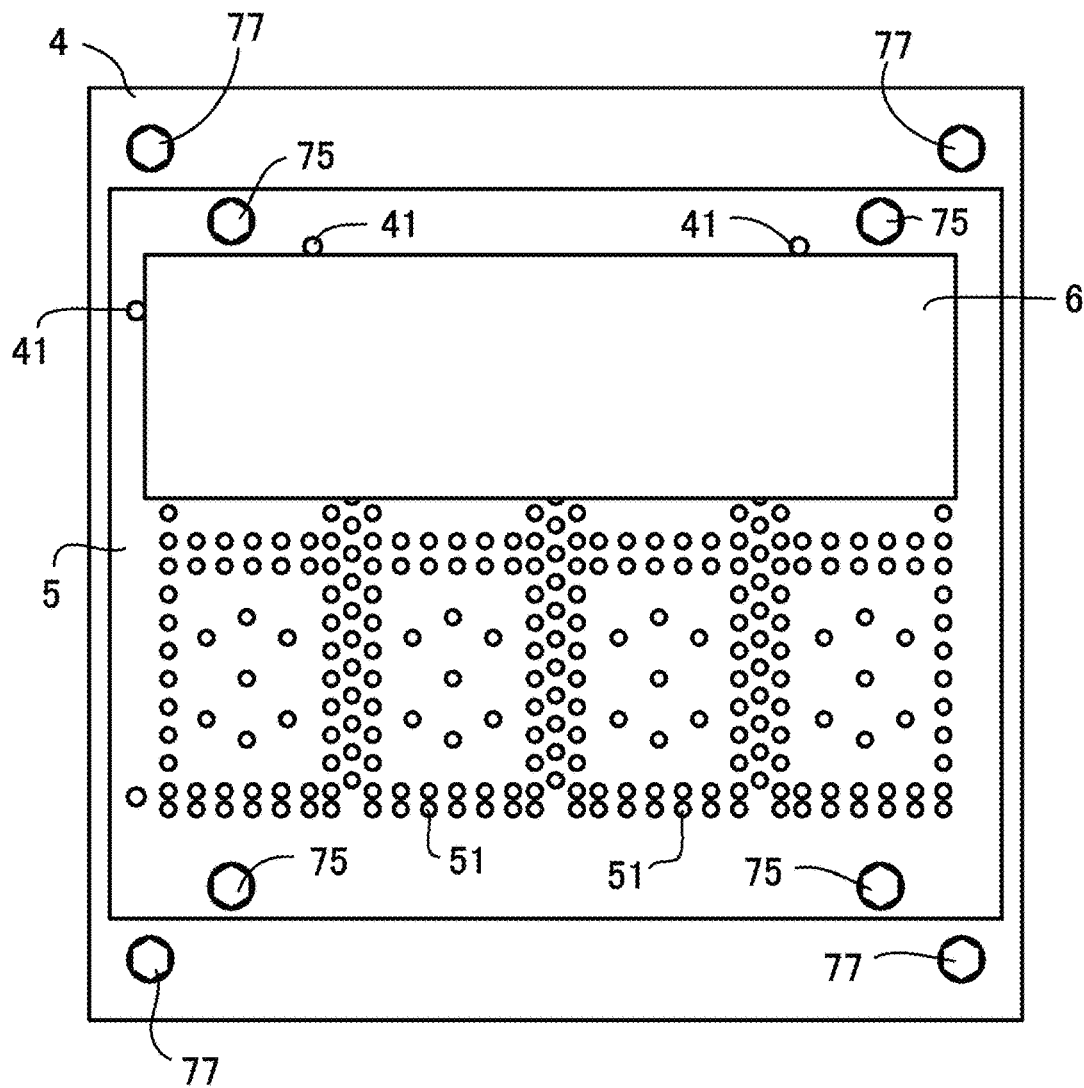
FIG. 10 is a top view of the sub-plate, the thin plate, and the fixing plate at a placing step.
Figure 11:
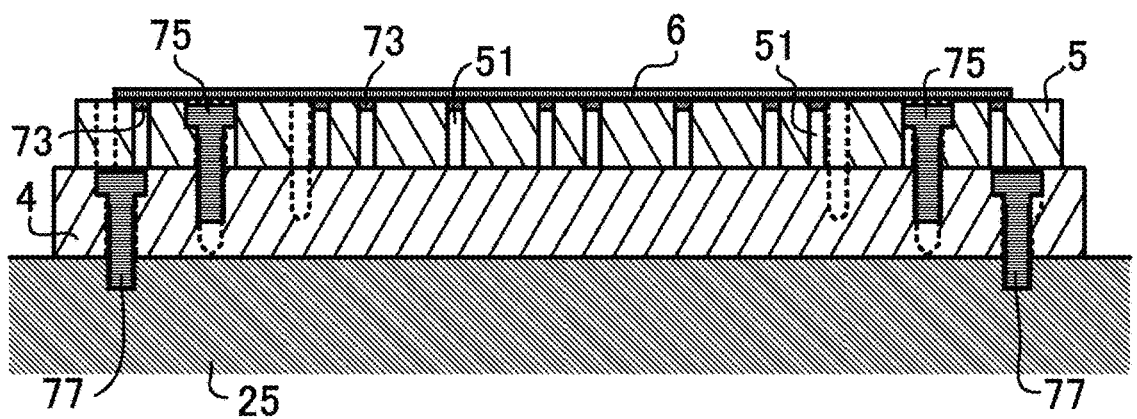
FIG. 11 is a cross-sectional side view of the sub-plate, the thin plate, and the fixing plate at the placing step.

After the rear surface processing step, or, after the adhering step in the case where the rear surface processing step is omitted, the placing step (S15) is performed. As shown in FIGS. 10 and 11, the fixing plate 5 to which the thin plate 6 is adhered is fastened to the sub-plate 4 by the bolts 75, and the sub-plate 4 is fastened to the build table 25 by the bolts 77. Thus, the sub-plate 4 as the mounting plate, the fixing plate 5, and the thin plate 6 are fixed to the build table 25 of the additive manufacturing apparatus 1 at the position with the thin plate 6 on the top.

After the placing step, the additive manufacturing step is performed. The additive manufacturing step is a step of repeating a material layer forming step (S16) and a solidifying step (S17) by using the additive manufacturing apparatus 1 until a desired number of the solidified layers 83 are obtained.

In the material layer forming step, firstly, the build table 25 is adjusted to a suitable height at which the material layer 81 with a predetermined thickness can be formed, and the recoater head 23 moves in the horizontal direction above the build region R. The build material spreads from the recoater head 23 is leveled off by the blade, and the material layer 81 consisting of the build material is formed on the build table 25. The first material layer 81 is directly formed on the thin plate 6. The second or later material layer 81 is directly formed on the solidified layer 83 one layer lower.

In the solidifying step, the irradiation device 3 irradiates a predetermined irradiation region of the material layer 81 with the laser beam L, and the solidified layer 83 is formed. As described above, in place of the laser beam L, the solidified layer 83 may be formed by using the electron beam.

The material layer forming step and the solidifying step as described above are repeated until the desired number of the solidified layers 83 are formed (S18). The thin plate 6 and the multiple solidified layers 83 formed on the thin plate 6 are fixed to each other. Accordingly, the multiple solidified layers 83 consisting of the build material are formed on the thin plate 6 by the additive manufacturing apparatus 1, and the three-dimensional object 85 in which the thin plate 6 and the solidified layers 83 are integrated is formed.

In the case where the additive manufacturing apparatus 1 includes the cutting device, a cutting step of performing cutting on the surface of the solidified layer 83 may also be executed every time when a predetermined number of the solidified layers 83 are formed.

After the additive manufacturing step, the detaching step (S19) is performed. Firstly, the fixing plate 5, the three-dimensional object 85 and sub-plate 4 are taken out from the additive manufacturing apparatus 1. Secondly, the fixing plate 5 and the three-dimensional object 85 are removed from the sub-plate 4 as the mounting plate. Then, the removing agent is applied to the adhesive layers 73 in the adhesive injection holes 51. For example, the fixing plate 5 and the three-dimensional object 85 are immersed in a container storing the removing agent, and the removing agent is supplied to the adhesive layers 73. The adhesive layers 73 are dissolved by the removing agent, the adhesion between the three-dimensional object 85 including the thin plate 6 and the fixing plate 5 is released, and the three-dimensional object 85 is detached from the fixing plate 5. At this time, since the three-dimensional object 85 can be removed from the fixing plate 5 without applying a large load to the three-dimensional object 85, the three-dimensional object 85 is hardly distorted or damaged.

After the detaching step, the secondary processing step (S20) is performed in correspondence with the use of the three-dimensional object 85. For example, the three-dimensional object 85 is moved to any secondary processing machine such as a machining center, and a desired secondary process is performed on the three-dimensional object 85. When placed in the secondary processing machine, the three-dimensional object 85 is fixed in the apparatus by a magnet clamp, for example. Also, in the case where the additive manufacturing apparatus 1 includes the cutting device, the additive manufacturing apparatus 1 may also serve as the secondary processing machine to perform the secondary processing step.

The invention is not limited to the configuration of the embodiments shown in the drawings, as some examples have already been specifically shown. Various modifications or applications are possible without departing from the technical idea of the invention.

The manufacturing method of the three-dimensional object of the embodiment may be used for manufacturing a sheet cutting apparatus. The sheet cutting apparatus includes a cutter 9 having a cylindrical core 91 and a blade member wound around the core 91. The core 91 may be provided with a magnet, and the blade member may be fixed to the core 91 by a magnetic force. The blade member is a so-called flexible die. The sheet cutting apparatus performs a punching process which rotates the cutter 9 on a sheet such as a seal, a sticker, and cuts the sheet in a desired shape.

Figure 12:
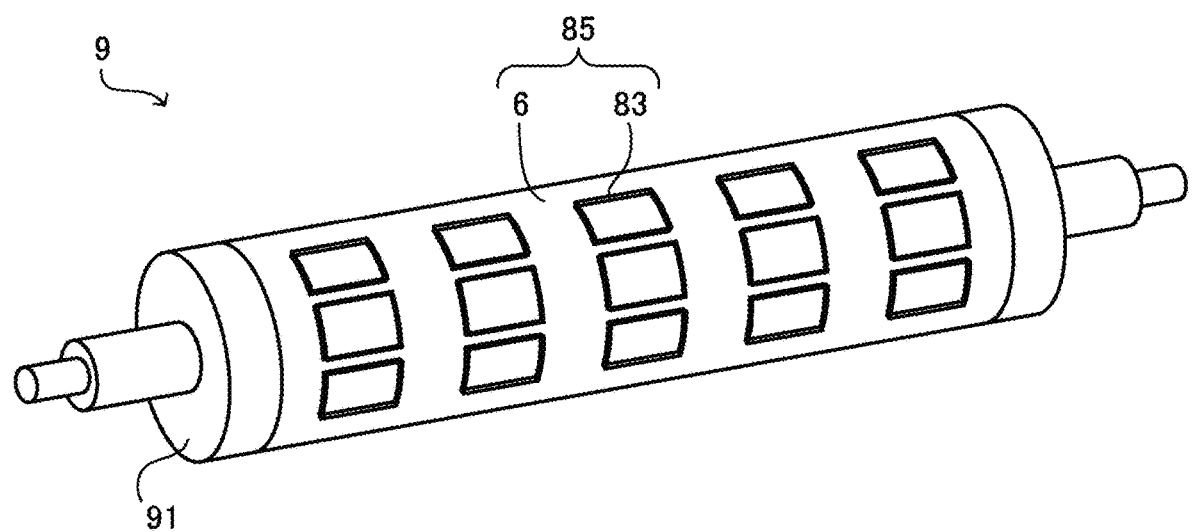
FIG. 12 is a view of the appearance of a cutter of a sheet cutting apparatus.

By using the manufacturing method of the three-dimensional object, the blade part of the cutter 9 is created. For example, an invar with a thickness of 0.03 mm is used for the thin plate 6, and a Co-free maraging steel is used for the build material. By using the additive manufacturing apparatus 1, the solidified layers 83 in a desired shape are formed on the thin plate 6, and by using the secondary processing machine, the upper end of the solidified layers 83 are sharply processed. The three-dimensional object 85 so obtained is used as the blade member of the cutter 9. As shown in FIG. 12, the three-dimensional object 85 is wound around the core 91 to be fixed, and the cutter 9 of the sheet cutting apparatus is manufactured.

Conventionally, a general etching process is used for manufacturing such a blade member. However, by adopting the manufacturing method of the three-dimensional object according to the embodiment, the manufacture can be performed without using an etchant. According to the manufacturing method, the cost relating to the etchant as well as the replacement and the disposal thereof can be suppressed, the safety can be increased, and the blade member can be manufactured by using a method with low environmental load.

What is claimed is:

1. A manufacturing method of a three-dimensional object, comprising:
   a positioning step of placing a fixing plate, which has a first surface and a second surface opposite to each other and in which a plurality of adhesive injection holes that are through holes are formed in a plate thickness direction, on a thin plate with a thickness of 1 mm or less, and positioning the thin plate to a predetermined position on the first surface of the fixing plate;
   an adhering step of, after the positioning step, dripping an adhesive into the adhesive injection holes from a side close to the second surface and solidifying the adhesive in the adhesive injection holes to form a plurality of adhesive layers in the adhesive injection holes in order to adhere the first surface of the fixing plate to the thin plate;
   a placing step of, after the adhering step, fixing the fixing plate and the thin plate onto a build table configured to be movable in a vertical direction of an additive manufacturing apparatus at a position with the thin plate on top;
   an additive manufacturing step of, after the placing step, forming a plurality of solidified layers consisting of a build material on the thin plate by the additive manufacturing apparatus, and forming the three-dimensional object in which the thin plate and the solidified layers are integrated; and
   a detaching step of, after the additive manufacturing step, taking out the fixing plate and the three-dimensional object from the additive manufacturing apparatus, and removing adhesion between the thin plate and the fixing plate by using a removing agent corresponding to the adhesive.

2. The manufacturing method of the three-dimensional object as claimed in claim 1, wherein the additive manufacturing step repeats a material layer forming step of forming a material layer consisting of the build material on the build table and a solidifying step of irradiating the material layer with a laser beam or an electron beam to form a solidified layer.

3. The manufacturing method of the three-dimensional object as claimed in claim 1, further comprising a secondary processing step of, after the detaching step, performing secondary processing on the three-dimensional object.

4. The manufacturing method of the three-dimensional object as claimed in claim 1, wherein in the positioning step,
   the thin plate is placed on a positioning plate to which a positioning member is mounted,
   the thin plate is brought into contact with the positioning member to be positioned, and
   the fixing plate is fit with the positioning member to be positioned.

5. The manufacturing method of the three-dimensional object as claimed in claim 1, wherein in the placing step,
   the fixing plate is fixed to a mounting plate,
   the mounting plate, the fixing plate, and the thin plate are fixed to the build table, so that the mounting plate is in contact with the build table.

6. The manufacturing method of the three-dimensional object as claimed in claim 5, wherein a bottom area of the mounting plate is greater than a bottom area of the fixing plate.

7. The manufacturing method of the three-dimensional object as claimed in claim 5, further comprising a rear surface processing step of processing a rear surface of the mounting plate before the placing step, so that the thin plate becomes horizontal during the additive manufacturing step.

8. The manufacturing method of the three-dimensional object as claimed in claim 1,
   wherein a thermal expansion coefficient of the thin plate is $5.0 \times 10^{-6}/°$ C. or less.

9. The manufacturing method of the three-dimensional object as claimed in claim 8, wherein the thin plate consists of a nickel-iron alloy.

10. The manufacturing method of the three-dimensional object as claimed in claim 1, wherein the thickness of the thin plate is 0.5 mm or less.

11. A manufacturing method of a sheet cutting apparatus, wherein the sheet cutting apparatus comprises a cutter having a core in a cylindrical shape and a blade member wound around the core material, and
   the blade member is manufactured, as the three-dimensional object, according to the manufacturing method of the three-dimensional object as claimed in claim 1.

* * * * *